(12) United States Patent
Challa

(10) Patent No.: US 8,457,408 B2
(45) Date of Patent: Jun. 4, 2013

(54) METHOD AND SYSTEM OF IDENTIFYING ONE OR MORE FEATURES REPRESENTED IN A PLURALITY OF SENSOR ACQUIRED DATA SETS

(75) Inventor: Subhash Challa, Bulleen (AU)

(73) Assignee: Sensen Networks Pty Ltd (AU)

( * ) Notice: Subject to any disclaimer, the term of this patent is extended or adjusted under 35 U.S.C. 154(b) by 728 days.

(21) Appl. No.: 12/439,531

(22) PCT Filed: Aug. 31, 2007

(86) PCT No.: PCT/AU2007/001274
§ 371 (c)(1),
(2), (4) Date: Jul. 28, 2009

(87) PCT Pub. No.: WO2008/025092
PCT Pub. Date: Mar. 6, 2008

(65) Prior Publication Data
US 2010/0054539 A1    Mar. 4, 2010

(30) Foreign Application Priority Data
Sep. 1, 2006  (AU) ................................ 2006904797

(51) Int. Cl.
*G06K 9/46*    (2006.01)
(52) U.S. Cl.
USPC .......................................... 382/190; 382/105
(58) Field of Classification Search
USPC ................. 382/105, 190, 208, 181, 155, 161, 382/100, 104
See application file for complete search history.

(56) References Cited

U.S. PATENT DOCUMENTS

| 6,226,409 B1* | 5/2001 | Cham et al. .................... 382/228 |
| 2004/0017944 A1* | 1/2004 | Ding et al. ..................... 382/182 |
| 2004/0022432 A1* | 2/2004 | Hayata et al. ................. 382/159 |
| 2004/0218785 A1* | 11/2004 | Kim ............................... 382/105 |
| 2005/0180632 A1* | 8/2005 | Aradhye et al. .............. 382/182 |
| 2005/0286772 A1* | 12/2005 | Albertelli ...................... 382/224 |

OTHER PUBLICATIONS

PCT International Search Report and Written Opinion, PCT/AU2007/001274, Nov. 13, 2007, 7 Pages.
Al-Hmouz, R. et al., "License Plate Localization Based on a Probabilistic Model," Machine Vision and Applications, Sep. 30, 2008, pp. 319-330, vol. 21, No. 3.
European Extended Search Report, European Application No. 07800232.6, Aug. 2, 2012, 7 pages.

(Continued)

*Primary Examiner* — Bhavesh Mehta
*Assistant Examiner* — Edward Park
(74) *Attorney, Agent, or Firm* — Fenwick & West LLP

(57) ABSTRACT

A method and system for identifying one or more features represented in a plurality of sensor acquired data sets is described. The method and apparatus is particularly useful in automatic license plate recognition applications, where the sensor acquired data sets are data obtained from one or more digital cameras. This is achieved by determining a first probability of the identity of the one or more features (eg alphanumeric characters) from a first one of the data sets; determining a second probability of the identity of the one or more features from a second one of the data sets; and, using data fusion techniques, fusing the determined first and second probabilities to provide a fused probability. This fused probability is used to identify the one or more features from data sets.

20 Claims, 12 Drawing Sheets

OTHER PUBLICATIONS

Huang, Z-B. et al., "Classifier Fusion-Based Vehicle License Plate Detect Algorithm," 2003 Proceedings of the Second International Conference on Machine Learning and Cybernetics, Nov. 2-5, 2003, pp. 2984-2989, vol. 5.

Kim, K.K. et al., "Learning-Based Approach for License Plate Recognition," Proceedings of the 2000 IEEE Signal Processing Society Workshop Neural Networks for Signal Processing, Dec. 11, 2000, pp. 614-623, vol. 2.

Koval, V. et al., "Smart License Plate Recognition System Based on Image Processing Using Neural Network," IEEE International Workshop on Intelligent Data Acquisition and Advanced Computing Systems: Technology and Applications, Sep. 8-10, 2003, pp. 123-127.

Paliy, I. et al., "Approach to Recognition of License Plate Numbers Using Neural Networks," 2004 IEEE International Joint Conference on Neural Networks, Jul. 25, 2004, pp. 2965-2970, vol. 4.

Sun, C.C. et al., "Vehicle Reidentification Using Multidetector Fusion," IEEE Transactions on Intelligent Transportation Systems, Sep. 2004, pp. 155-164, vol. 5, No. 3.

* cited by examiner (a)

(b)

(c)

(d)

5919BPL

METHOD AND SYSTEM OF IDENTIFYING ONE OR MORE FEATURES REPRESENTED IN A PLURALITY OF SENSOR ACQUIRED DATA SETS

This application is the National Stage of International Application No. PCT/AU2007/001274, published in English under PCT Article 21(2), filed Aug. 31, 2007, which claims priority to Australia Patent Application No. 2006904797, filed Sep. 1, 2006, which is incorporated by reference in its entirety.

TECHNICAL FIELD

The present invention relates to techniques for identifying features of data sets and particularly, but not exclusively, to identifying the presence of predetermined features in a plurality of related images.

BACKGROUND ART

Various methods of automatic detection and recognition of predetermined features from sensor data sets are known to the skilled addressee. For example, automatic license plate recognition (ALPR) from digital photography is presently used in several applications, including speed monitoring and infringement and toll management. In prior art methods, ALPR is usually accomplished using three processing steps, illustrated in FIGS. 1 to 3, after an image of a vehicle has been acquired. Firstly, the region of the license plate in the image is determined and a data set obtained including the data of the license plate (FIG. 1); secondly, the characters on the license plate are segmented for individual processing (FIG. 2); and thirdly, optical character recognition (OCR) techniques are employed on each segmented character to determined each character (FIG. 3).

The first step may be performed using a number of known techniques, including colour detection, signature analysis, edge detection, and so on. Any inclination from the horizontal line in the captured image is determined and the image rotated before it becomes ready for character recognition module. The image may also be further processed to remove noise.

For segmentation, a known histogram method may be used, where each character is labelled in the license plate image, and then each label is extracted. Each character in the plate is extracted in a single image and normalized prior to the recognition step.

With particular reference to FIG. 3, an example of an optical character recognition process is illustrated for determining the characters in the license plate of FIG. 1. To begin with, the segmented characters are first normalized and then fed into a neural network for character recognition. A back propagation feed forward Neural Network consisting of two layers has been selected. The input character size was resized to 20×50 pixels resulting in 1000 inputs to the input layer of neural networks. The output layer consists of 36 neurons each corresponding to one symbol of the alphanumeric character set. The neural network is then trained on 90 samples of noisy alphanumeric characters. As a result of the training, the output neuron corresponding to a certain character should give a value higher than the values of the other neurons when the same character is the input of the neural networks as shown in FIG. 3. For the neural network, each node in the output layer is associated with one character $C_k$ with outputs which vary from 0 to 1, this value corresponding to frame n. The neural network outputs are normalized and used as estimates of the a posteriori probability of each character:

$$p(C_k/f_n) = \frac{C_k}{\sum_{i=1}^{36} C_i}$$

For this prior art technique to work well, the quality of the acquired image must be of a level that allows a relatively clear photograph to be taken to increase the accuracy of the OCR techniques employed. This tends not to be an issue on open roads during daylight hours or under well lit street lighting. However, there are many situations where such optimum conditions are not available, such as at night time on roads with no or poor street lighting, during wet weather, in car parks, under bridges or in poorly lit tunnels. In such conditions, aforementioned prior art techniques may require the use of relatively expensive cameras which can operate in a variety of lighting conditions, and/or the use of additional lighting or flashes at the time of taking the photograph to illuminate the subject of the image being acquired. Also, error levels of such known methods have shown that about 1 in 5 license plates are incorrectly determined. There is a desire in the technical field to reduce this error.

SUMMARY OF THE INVENTION

According to a first aspect of the invention there is provided a method of identifying one or more features represented in a plurality of sensor acquired data sets comprising the steps of:
 determining a first probability of the identity of the one or more features from a first one of the data sets;
 determining a second probability of the identity of the one or more features from a second one of the data sets;
 fusing the determined first and second probabilities to provide a fused probability; and
 identifying the one or more features from the fused probability.

Advantageously, errors which may otherwise be present in assessing the probability of the presence of a character from one or more individual images are reduced when the probabilities are fused. This reduction in error allows for the use of relatively lower quality images compared with the prior art.

The fusing of the data may be achieved by a process referred to as "data fusion". Data fusion is a process of dealing with the association, correlation, and combination of data and information from single and multiple sources to achieve refined position and identity estimates for observed entities. It uses advanced mathematical inference techniques to reduce/eliminate false alarms inferred from the data, reduce dependence on ambience conditions and aims to result in the simplified deployment of reliable systems in challenging environments. The data fusion process employs continuous refinements of its estimates and assessments, and evaluates the need for additional sources, or modification of the process itself, to achieve improved results. An algorithm selected from the group comprising Bayesian Fusion, Distributed Data Fusion, Dempster-Shafer Fusion, Fuzzy Fusion, Random Sets Based Fusion, Voting and Dezert Samaranche Fusion may be used in the fusing step to fuse the determined probabilities.

The plurality of data sets may be acquired from one sensor at different times, or acquired from a plurality of sensors at approximately the same or different times.

The method may also comprise the steps after the fusing step, of:
 determining a third probability of the identity of the one or more features being present in a third one of the data sets; and fusing the first mentioned fused probability and the third probability to provide a second fused probability, wherein the step of identifying uses the second fused probability.

Or, the method may comprise the steps, after the fusing step, of determining $p(n)$; and fusing $p(\text{fused}_{n-2})$ with $p(n)$ to provide $p(\text{fused}_{n-1})$, where $p(n)$ is a probability of the one or more features being present in an nth one of the images, and $p(\text{fused}_{n-2})$ and $p(\text{fused}_{n-1})$ are (n−2)th and (n−1)th fused probabilities, respectively; and repeating the steps of determining $p(n)$ and fusing $p(\text{fused}_{n-2})$ with $p(n)$ for m times, where m=n−2, and n is an integer greater than 2, wherein the step of identifying uses $(\text{fused}_{n-1})$.

Preferably, each of the probabilities are probability distributions representing probabilities of the presence of each one of a set of predetermined said features in their respective data sets and wherein the identifying step is performed by determining which of the predetermined features has the highest probability from the probability distribution of the fused probability of the identifying step.

The data sets may be image data sets acquired from one or more cameras.

The one or more features may comprise alphanumeric characters. The plurality of data sets may comprise a different respective representation of a vehicle license plate, the plate displaying one or more of the alphanumeric characters. When the plate displays a combination of at least two alphanumeric characters, the method can be repeated to identify a first one of the two characters and then a second one of the two characters from each of the at least two data sets.

Preferably, prior to the step of determining the first probability, the number of alphanumeric characters present on the plate is determined, and the remaining said steps of the method are performed for each alphanumeric character determined as present on the plate.

In an alternative arrangement, the plurality of data sets may represent respective images comprising a representation of a license plate and the one or more features may comprise respective location(s) of the license plate in respective said images. Optionally, the first and subsequent probability(ies) may be first and subsequent probability density functions representing the probability of the license plate being in a location in the image. Also optionally, prior to the step of determining the first probability, the images used in the method may be subjected to black and white image thresholding and the probability determinations are performed on the thresholded black and white images.

In this arrangement, the first and subsequent probabilities may be determined using one or more parameters of the following group: size of a potential representation of the license plate compared to other potential representation(s) of the license plate; shape of the potential representation of the license plate; similarities of size and/or shape of the potential representation of the license plate in one of the images compared to the size and/or shape of another potential representation in another of the images; and the position of the potential representation of the license plate in one of the images relative to the position of another potential representation in another of the images.

According to another aspect of the invention there is provided a method of identifying a vehicle registration number from a plurality of images comprising representations of a vehicle registration plate, the method comprising the steps of:

determining a first probability distribution of alphanumeric characters present in a portion of one of the images;

determining a second probability distribution of alphanumeric characters present in a portion of another of the images, the portion of the other of the images corresponding to the portion of the one of the images;

fusing the first and second probability distributions to provide a fused probability distribution of alphanumeric characters in relation to the one and the other images; and identifying which alphanumeric character is present in the respective portions of the one and the other images by identifying from the fused probability distribution the alphanumeric character having the highest probability of being present.

An algorithm selected from the group of algorithms comprising Bayesian Fusion, Distributed Data Fusion, Dempster-Shafer Fusion, Fuzzy Fusion, Random Sets Based Fusion, Voting and Dezert Samaranche Fusion may be used in the fusing step to fuse the first and second probability distributions.

Preferably, the method comprises the steps after the fusing step, of determining $p(n)$; and fusing $p(\text{fused}_{n-2})$ with $p(n)$ to obtain $p(\text{fused}_{n-1})$, where $p(n)$ is a probability density function in relation to alphanumeric characters being present in an nth one of the images, and $p(\text{fused}_{n-2})$ and $p(\text{fused}_{n-1})$ are (n−2)th and (n−1)th fused probability density functions, respectively; and repeating these two steps for m times, where m=n−2, and n is an integer greater than 2, wherein the step of identifying comprises using $(\text{fused}_{n-1})$ to identify the alphanumeric character with the highest probability of being present.

Prior to determining the first probability distribution, the method may comprise the step of determining the number of alphanumeric characters present on the vehicle registration plate, after which the other steps of the method are performed for each alphanumeric character present on the vehicle registration plate.

According to another aspect of the present invention there is provided a method of identifying the number of people in a room from a plurality of images comprising representations of the room, the method comprising the steps of:

determining a first probability of the number of people represented in one of the images;

determining a second probability of the number of people in another of the images;

using a predetermined algorithm, combining the first and second probabilities to provide a fused probability of the number of people in the one and the other images; and using the fused probability, estimating the number of people in the one and the other images.

According to another aspect of the invention there is provided a computer program configured to cause a computer to perform the steps of the method of any of the above described aspects.

The method of any of the aspects described above may be implemented on a computer.

According to another aspect of the invention there is provided a system for identifying one or more features represented in a plurality of sensor acquired data sets, the system comprising:

one or more sensors configured to acquire a plurality of data sets;

a device in communication with the one or more sensors configured to acquire the data sets from the one or more sensors;

a calculating device configured to:

determine a probability of the identity of one of the features from at least two said data sets; and fuse the determined probabilities to provide a fused probability; and an identifying device configured to identify the one or more features from the fused probability.

The calculating device and the identifying device can comprise separate or a unitary computer or programmed computer processing unit (CPU).

The fusion may be calculated using an algorithm is selected from the group of algorithms comprising Bayesian Fusion, Distributed Data Fusion, Dempster-Shafer Fusion, Fuzzy Fusion, Random Sets Based Fusion, Voting and Dezert Samaranche Fusion.

The method aspects and their preferred embodiment can be adapted to be performed in a system employing a computer running a computer program which is arranged to carry out the aspects and embodiments.

Sensors used to acquire the data sets are preferably cameras, and further preferably cameras which acquire images using the visible spectrum. Such cameras may include cameras which capture black and white and/or colour still or moving images. Alternatively the sensors may comprise infrared sensors or thermal image sensors. In other alternative embodiments, other sensors such as motion sensors and distance sensors may be employed.

Other aspects of the invention comprise systems and apparatus for carrying out the above described method aspects. The systems may comprise cameras or other sensors for acquiring sensor acquired data sets and apparatus for performing the above described method steps. The apparatus may comprise programmable computers.

As will be understood, the term "vehicle license plate" should not be interpreted literally as a physical "plate", but includes physical plates and panels such as sticky paper or plastic panels and the like.

BRIEF DESCRIPTION OF THE DRAWINGS

Preferred embodiments of the invention will now be described, by way of example only, with reference to the accompanying drawings in which.

DETAILED DESCRIPTION OF THE PREFERRED EMBODIMENTS

A preferred embodiment of the invention involves identifying one or more features in the form of alphanumeric characters of a vehicle license plate represented in a plurality of sensor acquired data sets in the form of digital image files. The plurality of digital image files are taken of the same subject, in this embodiment being a vehicle license plate.

Figure 1:
FIG. 1 is an acquired image of a license plate.
Figure 2:
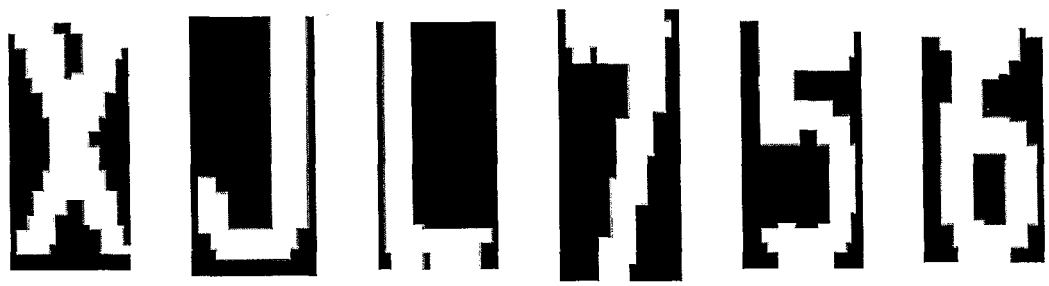
FIG. 2 illustrates the characters of the license plate illustrated in FIG. 1, where the characters have been segregated.
Figure 3:
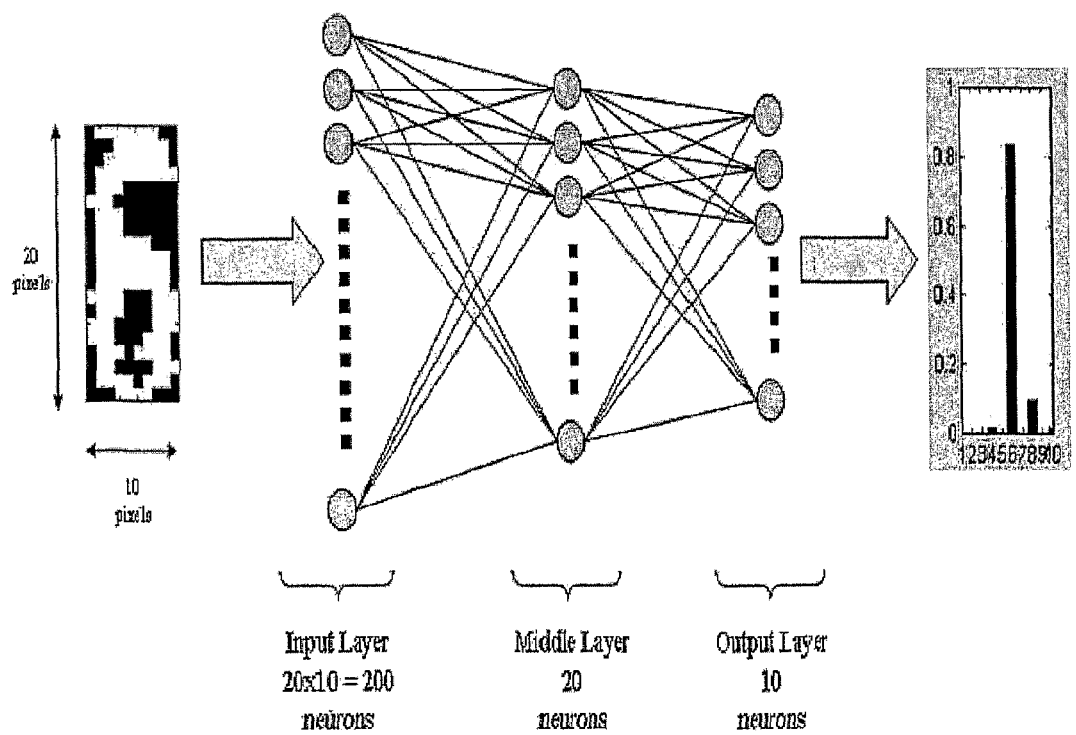
FIG. 3 is a representation of a prior art optical character recognition process.

In the presently described embodiment, four images are taken over time of a vehicle including its license plate, using one camera, however. For each image, the license plate is extracted, the characters segmented, and probability distributions determined for each character of each image using known processes, as described above with respect to FIGS. 1 to 3. The probability distribution for each respective character of the license plate in the first image is then fused with the probability distribution of each corresponding character in the second image to provide a first fused probability distribution for each character. This first fused probability distribution for each respective character is then fused with the probability distribution of each corresponding character in the extracted plate image data of the third image to determine a second fused probability distribution. The second fused probability distribution is then fused with the probability distribution of each corresponding character in the extracted plate image data of the fourth image to determine a third fused probability distribution. This third fused probability distribution is then used to estimate the characters on the license plate which is the subject of the four images.

The fusing steps are performed by using a data fusion algorithm, in this embodiment being Bayesian fusion, which may be described as follows.

If we let $$p(C_1/f_n), p(C_2/f_n), \ldots, p(C_m/f_n)$$

be the probability density function of an extracted image n of a license plate, where m is the number of characters, then the probability density functions for each respective character in the first extracted image is:

$$p(C_1/f_1), p(C_2/f_1), \ldots, p(C_m/f_1)$$

and for the second image is:

$$p(C_1/f_2), p(C_2/f_2), \ldots, p(C_m/f_2)$$

The density functions for the first and second images are then fused using Bayesian inversion to provide an overall character posterior of $C_k$:

$$p(C_k/f_1, f_2) = \frac{p(f_1/C_k, f_2) \cdot (C_k/f_2)}{p(f_1, f_2)}$$

Since all the extracted plate images are independent from each other:

$$p(f_1/C_k, f_2) = p(f_1/C_k) \text{ and}$$

$$p(f_1, f_2) = p(f_1)(f_2)$$

then $$p(f_1/C_k) = \frac{p(C_k/f_1) * p(f_1)}{p(C_k)}$$

where $p(f_1)$, $p(f_2)$ and $p(C_k)$ are the normalisation parts. Therefore $$p(C_k/f_1,f_2) = \nabla p(C_k/f_1)p(C_k/f_2).$$

Recursive updating is simplified assuming conditional independence of the measurements, which implies:

$$p(C_k/f_1, f_2, \ldots, f_n) = \nabla \prod_{\gamma=1}^{n} p(C_k/f_\gamma)$$

Figure 4:
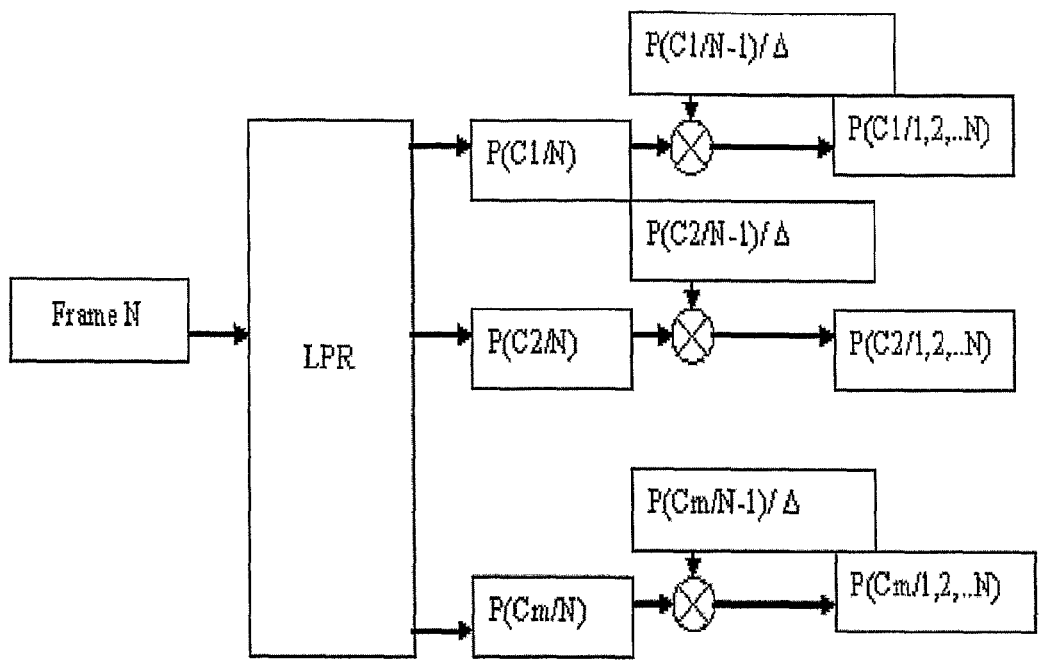
FIGS. 4 and 5 are flow diagrams of a fusion method employed in the present invention for images taken from single and multiple cameras, respectively.
Figure 5:
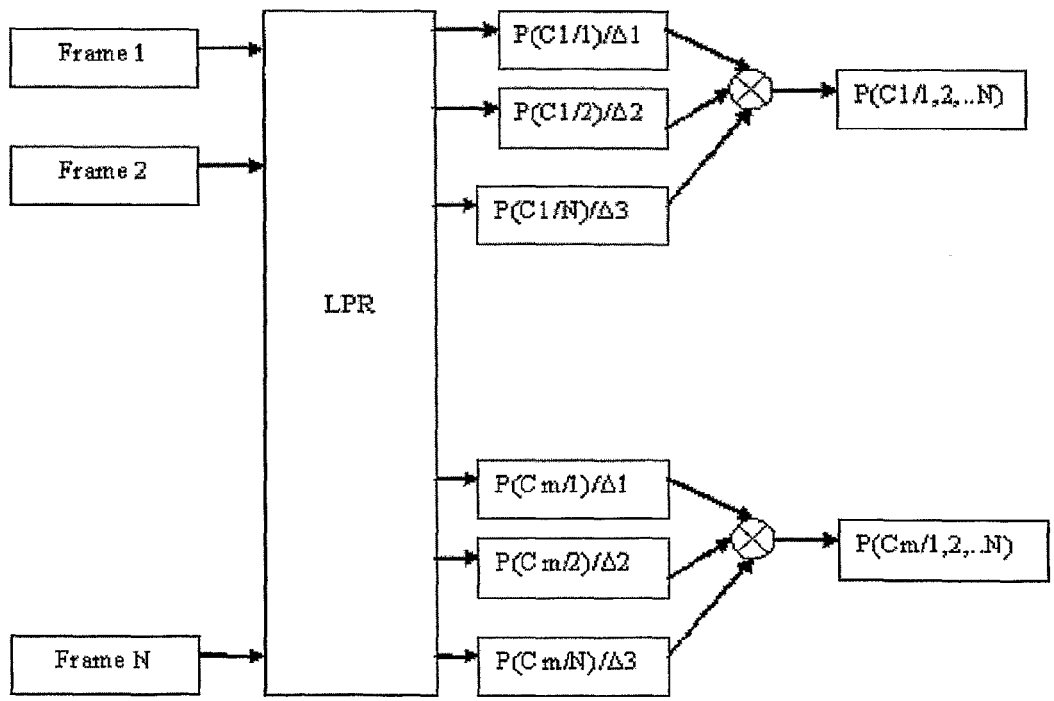

FIG. 4 illustrates, in overview, the above described embodiment which is applied when using multiple images from one camera. However, as will be understood, alternative embodiments may employ images from multiple cameras, in which case, in overview, the method would be as illustrated in FIG. 5.

Figure 6:
FIGS. 6a-d illustrate four images of a car taken over a predetermined time period.
Figure 6:
Figure 6:
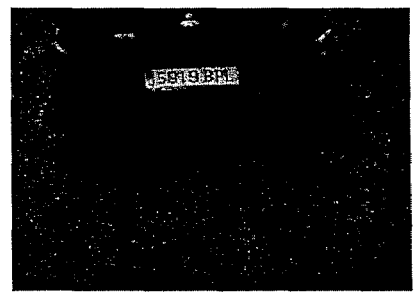
Figure 6:
Figure 7:
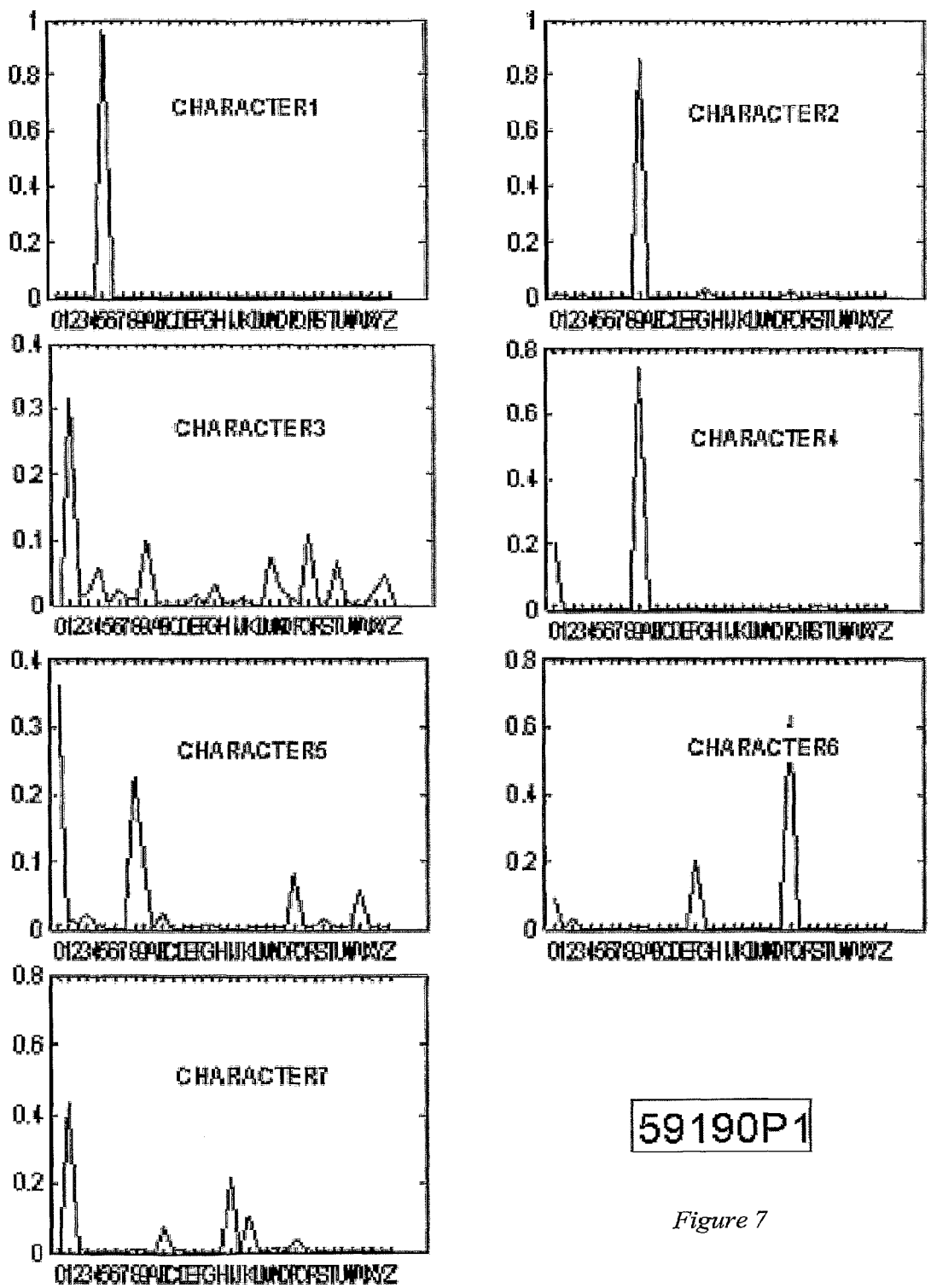
FIGS. 7 to 10 illustrate probability distributions for each character in the license plate of the car illustrated in FIGS. 6a-d, respectively.
Figure 8:
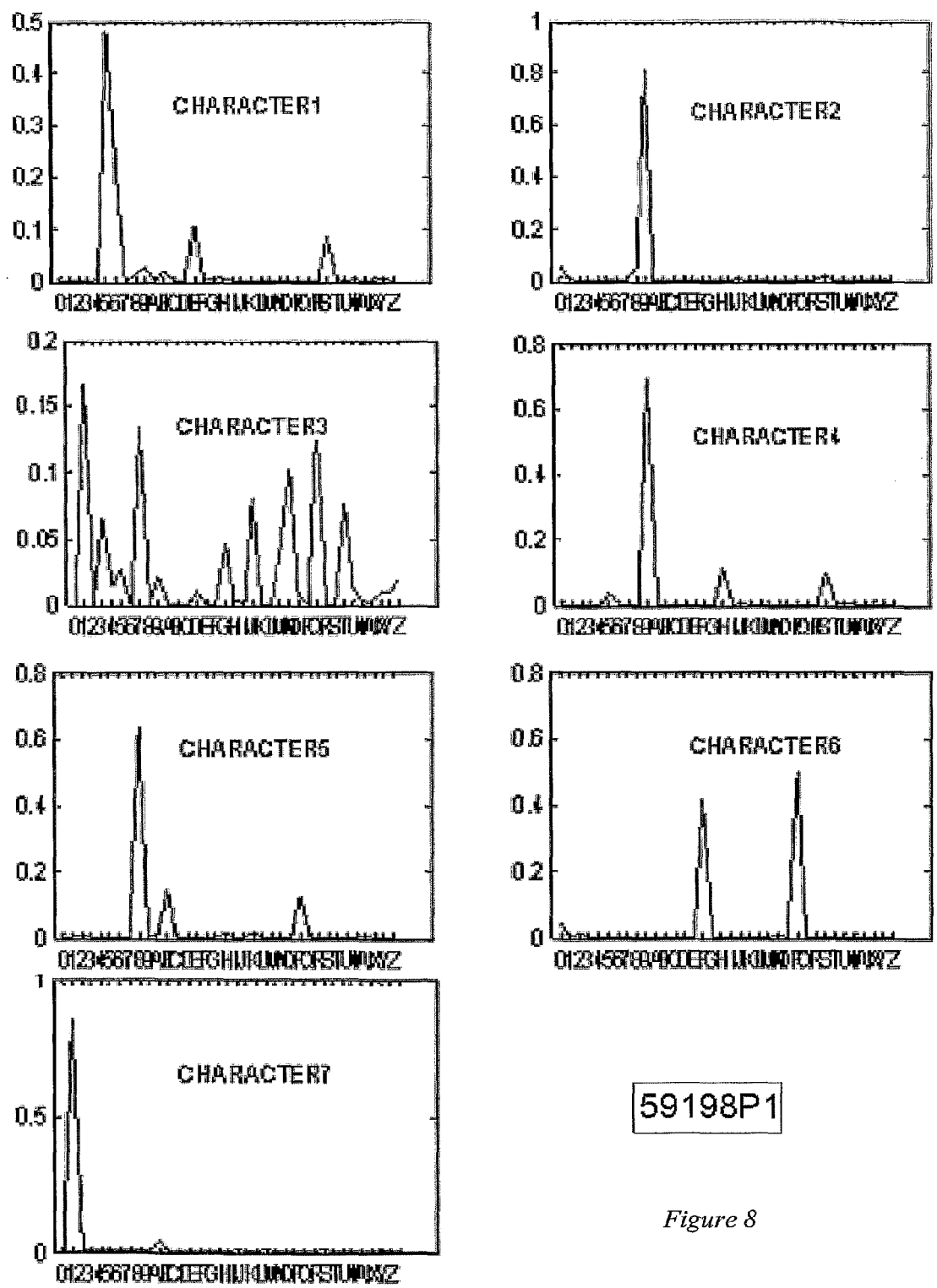
Figure 9:
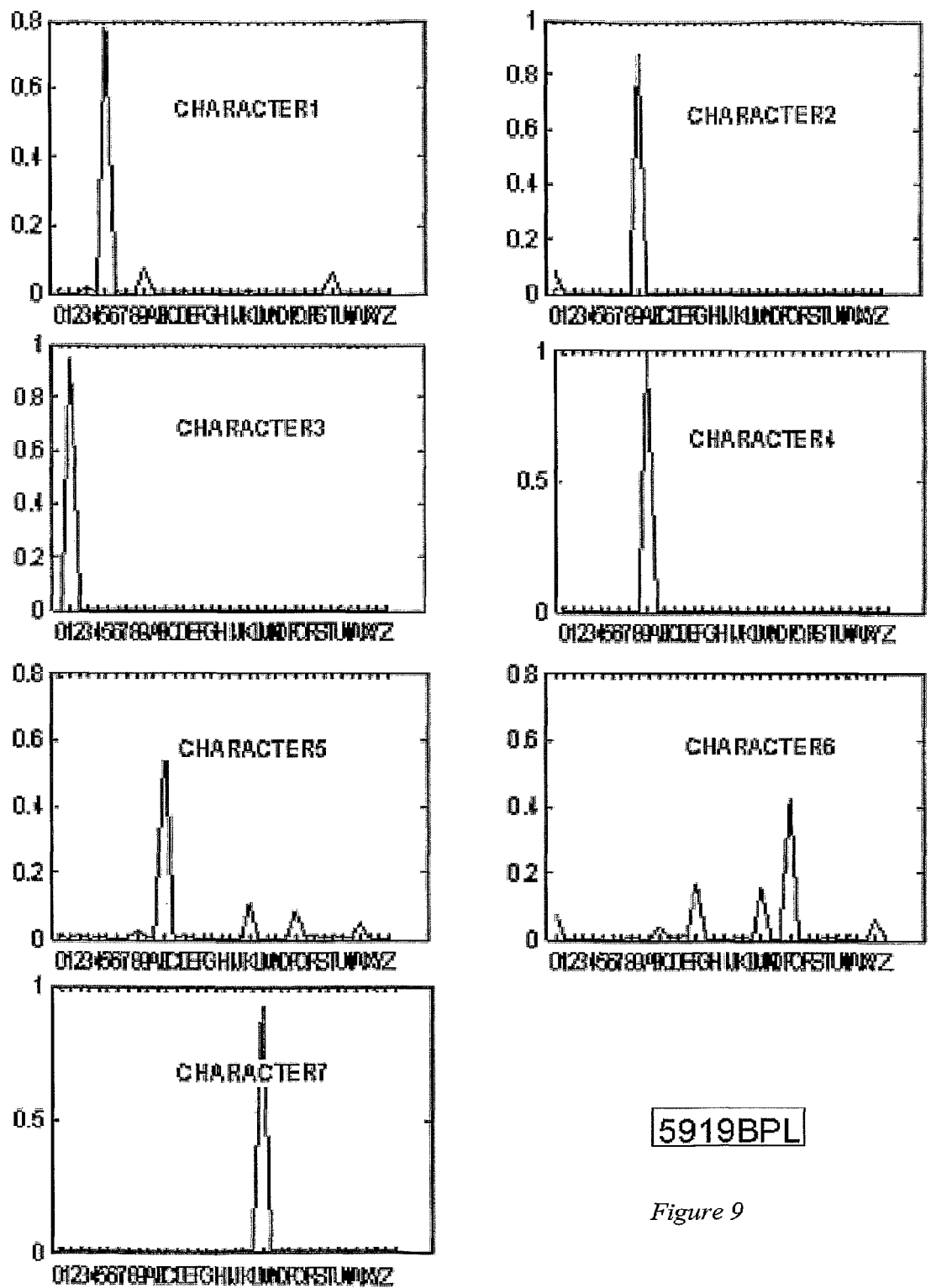
Figure 10:
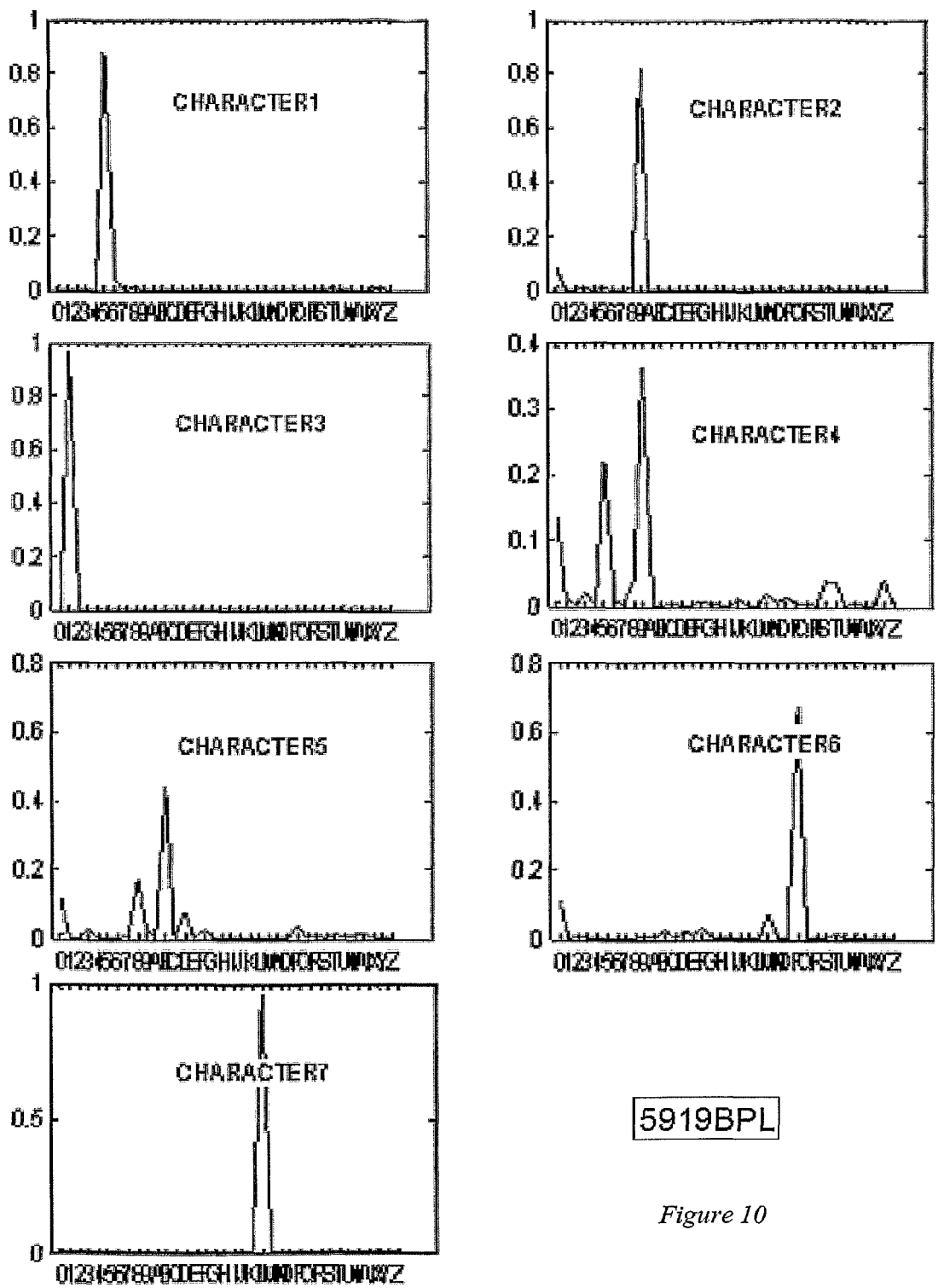

The preferred embodiment will now be described with reference to a particular example. Four images of a vehicle having a vehicle license plate are acquired over time, as illustrated in FIGS. 6a-d. As shown in each of FIGS. 6a-d, the license plate has the seven characters "5919 BPL". For each image, using the above described known methods, the license plate is extracted, segmented, and a probability distribution determined for each of the characters of each extracted license plate image. The probability distributions for each of the seven characters in the first to fourth images, FIGS. 6a-d, are illustrated in FIGS. 7 to 10, respectively, where the x-axis of each graph represents alphanumeric characters 0-9, a-z and the y-axis of each graph represents a probability that the character in question is present in the image. Based on the probability distribution of each image, an estimated identity for the characters in each of the four license plate images is also shown in their respective FIGS. 7 to 10. FIGS. 9 and 10 show that the single image estimate of the license plate characters of images illustrated in FIGS. 6c and 6d have been correctly identified, whereas neither of the estimated identities illustrated in FIGS. 7 and 8 of the license plate characters in the images illustrated in FIGS. 6a and 6b are correct. The recognition process applied to the images in FIGS. 6a and 6b has identified the character 'B' as '0' and '8' respectively, because there is some similarity among their shapes. At this point a decision has to be taken to raise one recognition solution over the others.

Figure 11:
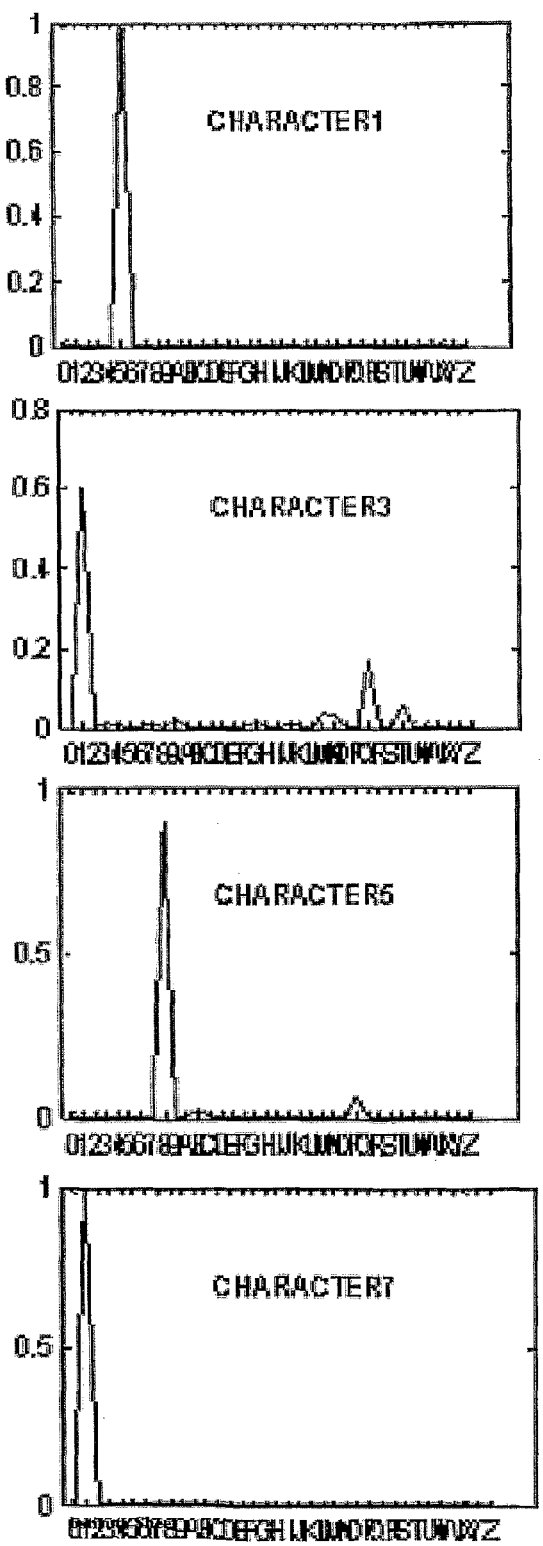
FIGS. 11 to 13 illustrate fused probability distributions determined using an embodiment of the present invention.
Figure 11:
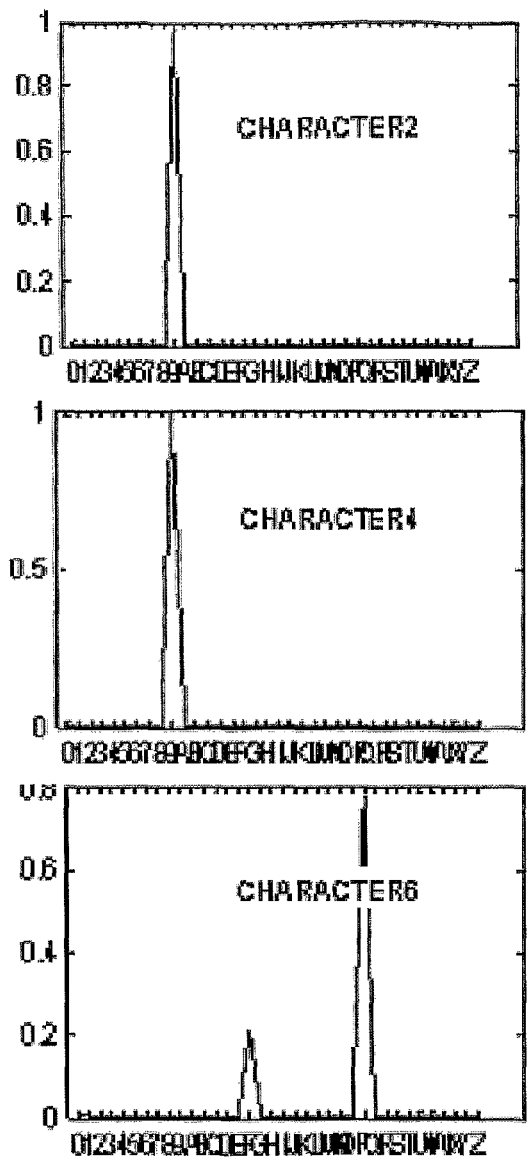
Figure 12:
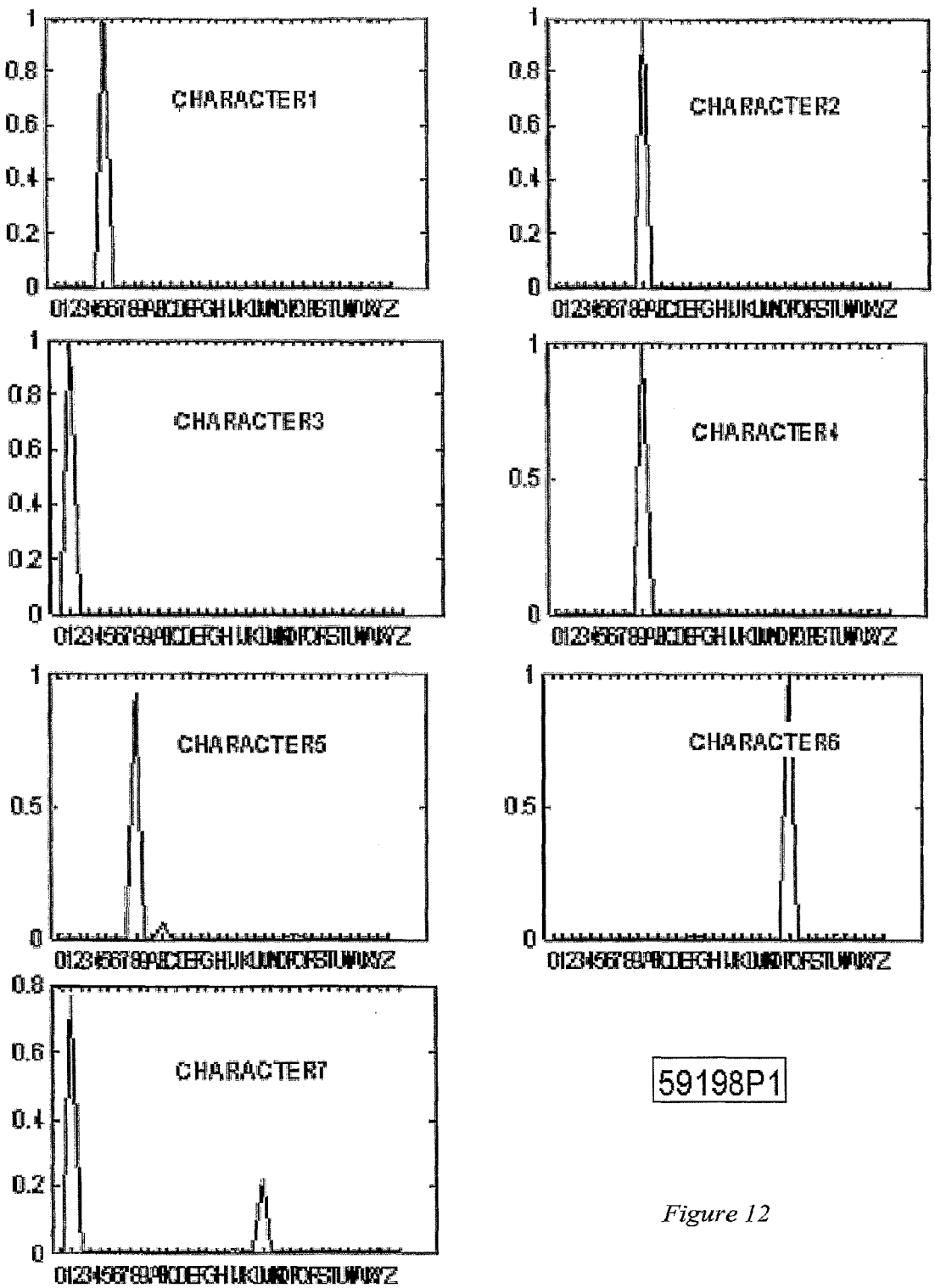
Figure 13:
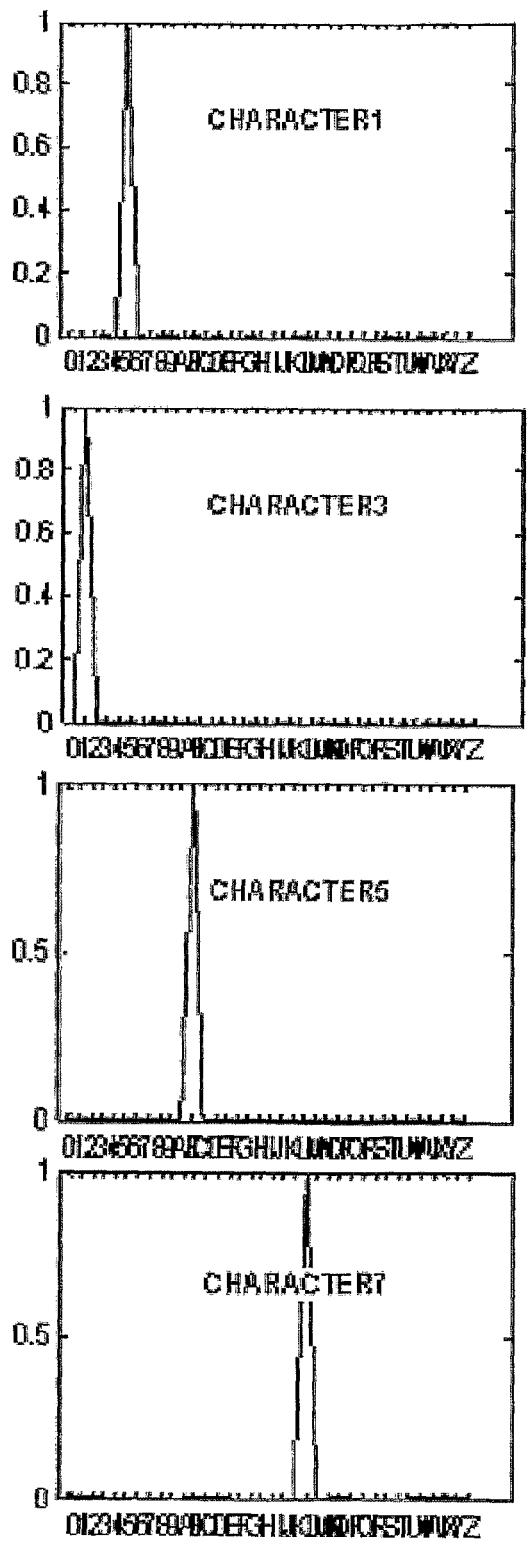
Figure 13:
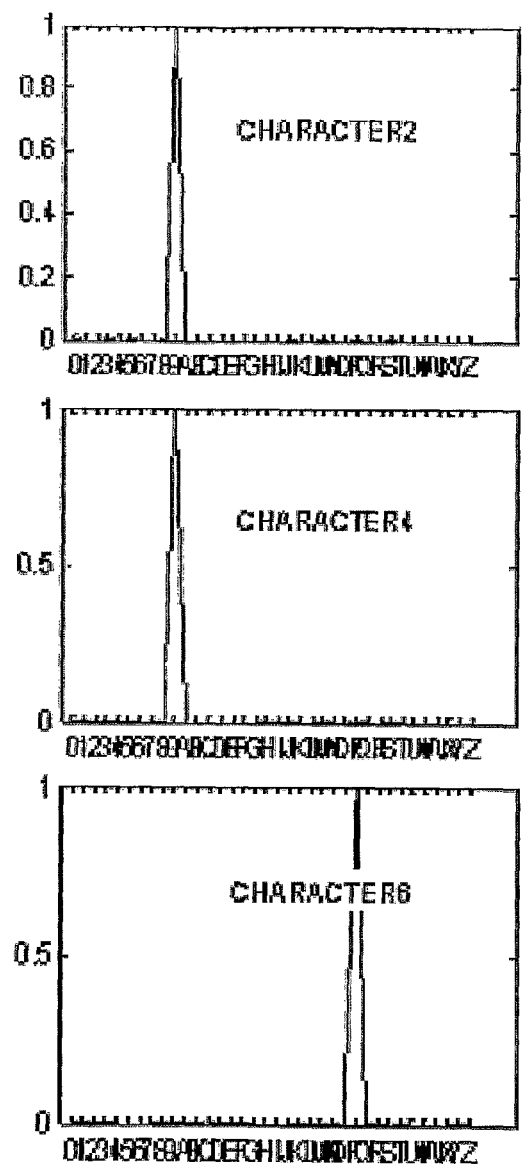
Figure 14:
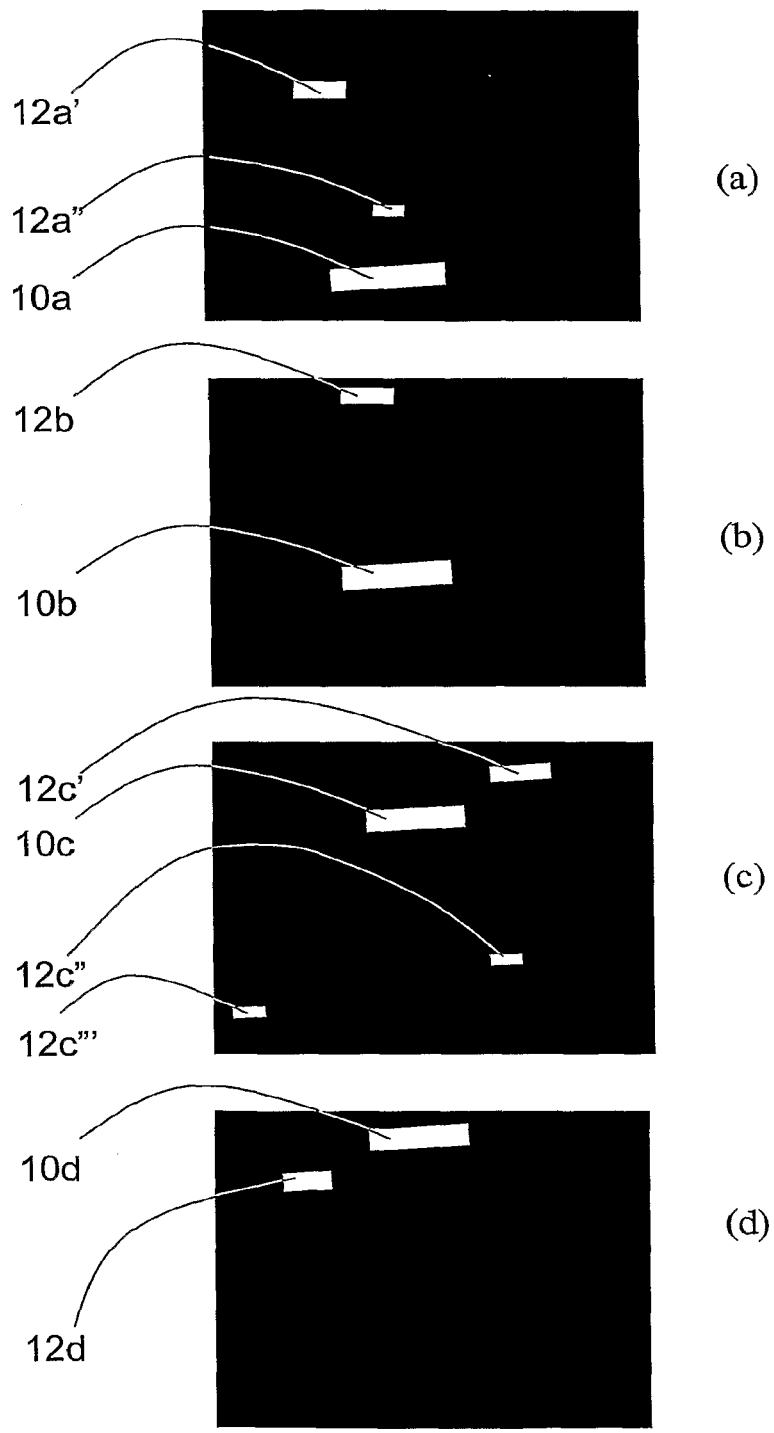
FIGS. 14a-d illustrate theoretical binary images converted from the images illustrated in FIGS. 6a-d using threshold techniques.

Rather than using manual intervention, in the present embodiment data fusion is used to provide a single, more accurate estimation of the license plate. Using the method described above with reference to the process illustrated in FIG. 4, the respective corresponding probability distributions illustrated in FIGS. 7 and 8 of each of the characters in the license plate illustrated in FIGS. 6a and 6b are fused using Bayesian fusion to provide a first fused probability distribution illustrated in FIG. 11. This first fused probability distribution of each segmented character is then fused with the respective corresponding probability distributions illustrated in FIG. 9 of the image illustrated in FIG. 6c using Bayesian fusion to provide a second fused probability distribution illustrated in FIG. 12. The second fused probability distribution of each segmented character is then fused with the respective corresponding probability distributions illustrated in FIG. 10 of the image illustrated in FIG. 6d using Bayesian fusion to provide a third fused probability distribution illustrated in FIG. 13. As illustrated in FIG. 13, the end result correctly identifies each of the characters of the license plate illustrated in FIGS. 6a-d.

Given that the data fusion process reduces the error associated with identifying license plate characters, when compared with known character recognition techniques for single images, preferred embodiments realise several advantages. For example, the image quality does not need to be of as high a standard compared with prior art techniques. Therefore, additional lighting and ideal camera placement that may be required to increase the accuracy of prior art methods are not necessary in the preferred embodiment. Also, it is not necessary to use dedicated license plate image capture cameras with the present embodiment, but instead images captured by existing devices, such as closed circuit television (CCTV) cameras, or highway monitoring cameras, may be used. The preferred embodiment is therefore more cost effective and simpler to install and/or set up compared with prior art methods and equipment.

The above embodiment has been described with reference to the use of four images for convenience of explanation. As will be understood, the method can be used with two, three, or more than four images, however the inventors have found that in some cases acceptable accuracy can be achieved using four images. For instance, depending on image quality, the accuracy using four images from a single source can be about 87-90%, which is a significant improvement compared to the prior art. In embodiments where very high accuracy is required, seven, nine or more images may be used, which the inventors have found can provide an accuracy of at least 95%. If image quality is relatively low, for example where there is poor contrast in the image due to under or overexposure lighting conditions, or if the vehicle is moving quickly relative to the camera, more images may be required. For example, when attempting to determined the characters on a license plate of a vehicle moving over 50 km per hour relative to the camera, fifty images may be taken at high speed for use in the present embodiment.

Whereas the preceding embodiment has been described with reference to identifying license plate characters, alternative adaptations of this embodiment may be used alone or in combination with this embodiment to estimate other license plate parameters, such as license plate colour or license plate type. This is particularly useful in countries or regions where there are several styles and colours available for license plates. For example, in New South Wales, Australia, there are at least five different available sizes of license plates and at least 16 different combinations of colour and/or style.

The above embodiment has been described with reference to license plates, which are typically understood to be registration plates or number plates used to identify a vehicle (eg automobile, motorbike, trailer, truck, etc) used on roadways, but may also be adapted for use in determining alphanumeric characters in different situations, such as for estimating characters from images of boat registration numbers, which are typically affixed to an above water hull side of a boat. This alternative embodiment may be useful for determining the registration details of boats moored in a marina, for example. Images for use in this embodiment can be obtained from CCTV or other cameras.

In another embodiment, which may be considered in isolation of or used in conjunction with the above described embodiment, a similar process to the above described embodiment is used in the step of extracting the license plate from the images. Referring again to FIGS. 6a-6d, in this arrangement four images are taken from a single camera source of a vehicle. These images are then processed to determine which part of each image contains the license plate. This is achieved by firstly converting the images into binary images using known thresholding techniques, for example as available for use in "PHOTOSHOP®", an image editing software product of Adobe Systems Incorporated. Threshold converted binary images are illustrated in FIGS. 14a-14d, where FIG. 14a corresponds to FIG. 6a, FIG. 14b corresponds to FIG. 6b, and so on. The areas of each binary image that are likely to contain the license plate are then established, as denoted in FIGS. 14a-14d by numerals 10a-10d. In practice, the determination of which location in the binary image contains the license plate can be difficult to make, as typically the binary images include image artefacts (eg denoted by numerals 12a-12d) that could be incorrectly interpreted as representing the vehicle license plate. Added to this difficulty is that the vehicle may be moving during the acquiring of the images and therefore its license plate may be in a different location in each image. The inventors have realised that artefact(s) 12a-12d present in one of the binary images are highly unlikely to be present in the other image conversions. With this in mind, the inventors have discovered that the above described fusion technique can be applied to the binary images to determine the location of the license plate in each image.

The location of the license plates in the images may be achieved in the following manner, with reference to FIGS. 6a-6d and 14a-14d. Once the binary images (FIGS. 14a-14d) are obtained, probability density functions are determined for each converted representation, the probability density function representing the probability that a location identified in a converted image is the correct location of the license plate in that converted image. In this embodiment, this is achieved by identifying each possible location of the license plate in each converted image. For example, in FIG. 14a, three potential license plate locations have been identified as denoted by numerals 10a, 12a' and 12a". A probability density function is then calculated for the image, representing the probability of each identified potential location as being the correct license plate location in the converted image. Each function provides a probability weighting for each identified possible location (in FIG. 14a, locations 10a, 12a', 12a"; in FIG. 14b, locations 10b, 12b; in FIG. 14c, locations 10c, 12c', 12c", 12c"'; in FIG. 14d, locations 10d, 12d). Parameters considered in calculating the density functions include relative size and shape of the possible locations, and relative distance traveled of a possible license plate location, in terms of Cartesian coordinates, from one image to the next. This latter parameter is determined by assuming the location in question is the correct location, pairing it with each identified possible location in the proceeding image, and determining whether it is likely the location would have moved from the first location to the second location over the change in time between when the two images were taken. For example, consider the pairing together of location 10a from FIGS. 14a and 10b from FIG. 14b. Their relative sizes and shapes are similar from one image to the next, and 10b has moved in terms of relative Cartesian coordinates by a non-substantial distance. This implies there is a relatively high probability that each location 10a, 10b are the correct locations of the license plate in binary images of FIGS. 14a,14b. Then consider the pairing of location 10a from FIG. 14a and location 12b from FIG. 14b. The relative sizes and Cartesian coordinates of these two possible locations are much different compared with 10a and 10b. This would impact negatively the probability that either of these two locations represents the correct location of the license plate. From these calculations made by considering each position pair, the probability density functions of the potential locations (10a-d, 12a-d) from each binary image are determined.

Once the probability density functions are calculated for each converted image, the same data fusion process described above with respect to the first described embodiment is applied to the four probability density functions in this embodiment. That is, the first binary image's probability density function is fused with the second binary image's probability density function to provide a first fused probability density function. Then, the first fused probability density function is fused with the third binary image's probability density function to provide a second fused probability density function. Finally, the second fused probability density function is fused with the fourth binary image's probability density function to provide a third fused probability density function. The third probability density function is then used to determine which of the locations of the binary images 14a-d are the correct locations of the license plate in each binary image. From this information, the license plate of each image can be extracted and used to determine the alphanumeric details, for example using the above described embodiment.

An adaptation of the above embodiments comprises a either a portable or a hand-held unit which may be used by police or other authorities or industries to quickly and simply identify the license plate or boat registration of a vehicle. The portable or hand-held unit comprises a camera, a visible display unit (VDU), a memory, and a controller such as a processor. In use, a user would direct the hand-held unit at the license plate or boat registration and press an actuating button. Pressing the button causes the camera to take four images, which are then processed by the processor using the above described probability distribution fusion method and the license plate characters or boat license characters are identified and displayed on the VDU. The images and their identified license/registration details are saved to the memory for later use. This embodiment has the advantage that the user using the hand-held device does not need manually to scribe the details of the license plate, increasing ease of transcription and obviating human error.

Another embodiment is a method for identifying the one or more features in the form of people represented in a plurality of data sets in the form of digital image files. This embodiment can be used to count the number of people in a room, using images acquired from CCTV cameras or other cameras.

In a particular form of this embodiment, four images of a room and its contents are obtained at the same time from four different cameras. Several known image analysis algorithms can be used to estimate the number of people in each image. In this embodiment, the hidden Markov model is used to estimate the number of people represented in each image and the Shannon-Entropy technique is used to adaptively control the estimation accuracy, to provide a "massaged" data set for each of the four images. As the hidden Markov model and the Shannon-Entropy technique are known to those skilled in the art, they are not described in detail here. A probability of the number of people estimated to be present in the room is provided for each respective image from the massage data sets. The four probabilities from the respective massaged data sets are then fused in the same manner described above with respect to the embodiment for identifying vehicle license plate characters. That is to say, first and second probability distributions corresponding to the first and second room images are fused using a Bayesian fusion algorithm to provide a first fused probability; the first fused probability is then fused with a third room image using the Bayesian fusion algorithm to provide a second fused probability; and the second fused probability is then fused with a fourth room image using the Bayesian fusion algorithm to provide a third fused probability. The third fused probability is then used to identify the number of people in the room which is the subject of the four images.

As will be understood, this embodiment is not limited to the use of data for single images from multiple images, but can be used to identify the number of people using image data from multiple images of one camera, or one or more images from multiple respective cameras. Also, whereas four images are all that is required to achieve an acceptable accuracy, fewer or more images may be used. For instance, the inventors have found that the error (% difference between the actual count and the estimated count) reduces from about 15% using a single camera and a single image to about 5% using two cameras.

If one camera is used, the images used to identify the number of people in the room would be taken close together in terms of time; for example, four images may be taken in a 1 or 2 second period. In this way, the embodiment can take into account whether people enter or leave the room, thus affecting the actual number of people in the room. Also, the embodiment may be employed in a system comprising a computer program controlled by a computer or other controller which continually receives data from a camera, such as a CCTV, and continually estimates the number of people in the room using the above described embodiment. Therefore, the number of people present and entering and leaving a room can be monitored over time.

This embodiment has several useful applications. For example, if combined in a system where all rooms in a building are monitored, the system can be used to estimate the number of people in the building at any given time. Also, whereas this embodiment has been described with reference to use in rooms, it can be adapted to count the number of people present at outdoor events, such as sporting matches, entertainment events, or legal or illegal gatherings of people. Such people counting is a useful tool for crowd control. Also, this embodiment is not limited to counting people, but can be used to count objects such as motor vehicles, furniture, etc, for either control or security reasons.

The above described embodiments have been described with reference to the use of Bayesian fusion. In alternative embodiments, different algorithms are used, such as Distributed Data Fusion, Dempster-Shafer Fusion, Fuzzy Fusion, Random Sets Based Fusion, Voting and/or Dezert Samaranche Fusion.

Figure 15:
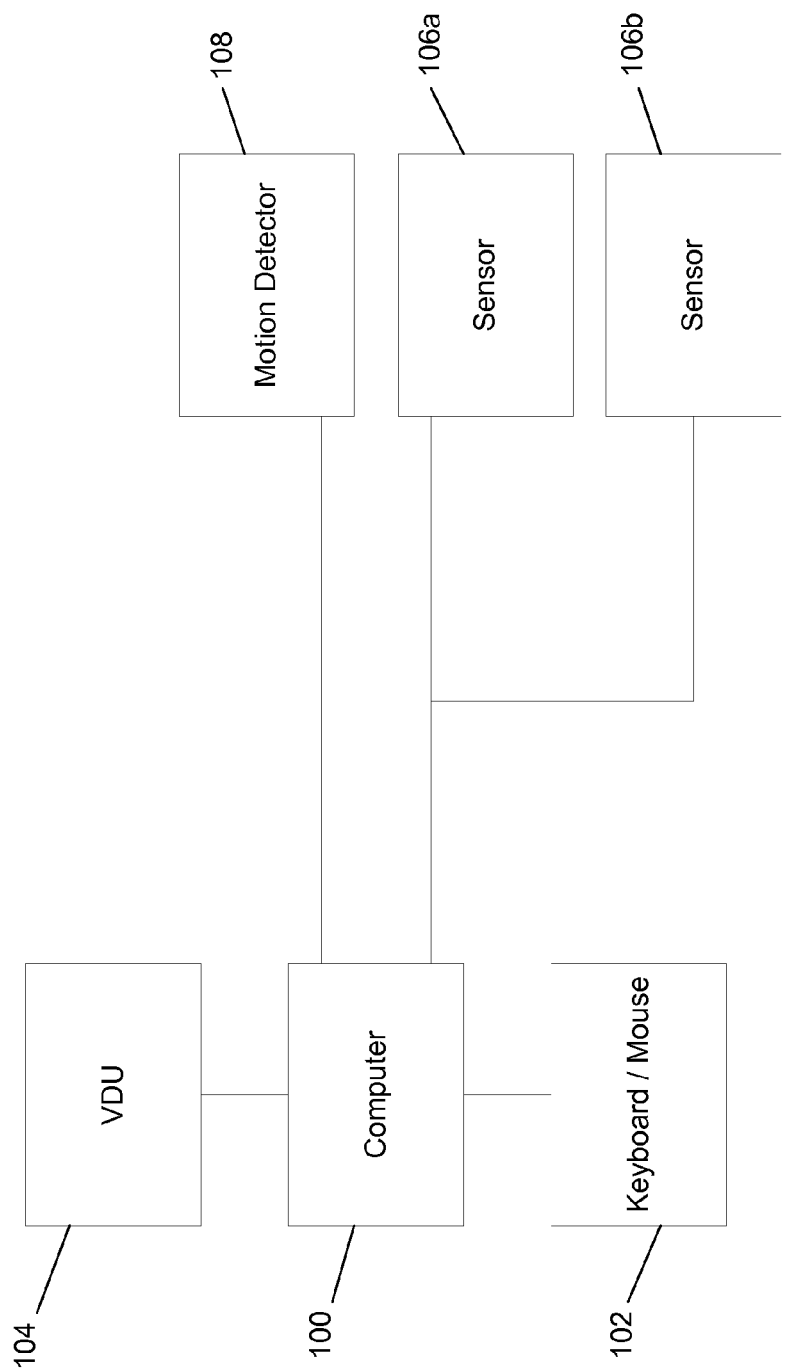
FIG. 15 illustrates a block diagram of an embodiment of a system for use with various method embodiments of the present invention.

It will be appreciated that the above described embodiments can be implemented by appropriate a system of computer hardware and software. An embodiment of computer and other hardware which may implement the above described embodiments is illustrated in FIG. 15. FIG. 15 illustrates a computer 100 having a standard hardware configuration comprising a hard disk drive (HDD), bus, external data input means (for example a floppy disc drive, serial port, parallel port, USB port or firewire port) and central processing unit (CPU). Input means in the form of a computer keyboard and/or a mouse 102 is/are connected to the computer 100 to input information, and to instruct the CPU to execute a program loaded thereon. A visual display unit (VDU) 104 is connected to the computer 100 to display information relating to the or each program being run on the computer 100. One or more sensors in the form of cameras 106a, 106b, etc, are connected to the computer and configured to send images they acquire to the computer 100. An optional motion detector 108 is also connected to the computer. This system will now be described for use with the above described LPR embodiments; only sensor 106a is used in this embodiment of the system. The sensor 106a is positioned in a carpark near its exit. The motion sensor 108 is similarly positioned. When a user instructs the computer 100, using the keyboard and/or mouse 102, to run the program for LPR, the motion detector 108 is activated. When motion of a vehicle through the carpark exit is detected by the motion detector 108, the sensor 106a takes four successive digital photographs of the vehicle which are transferred to the computer 100. The CPU runs the program which performs the method steps of the LPR embodiment and illustrates the LPR result on the VDU 104. The result is also stored on the computer's HDD for later data access. The images may also be stored on the HDD for later comparative reference to the result. Four images are taken of each vehicle detected by the motion detector 108, the program performing the LPR embodiment method steps for each vehicle and storing each result and its associated four images for each vehicle.

The above described system can also be configured for use with the above described people counting embodiment. In one such arrangement, two sensors 106a, 106b are positioned in a room. No motion detector is used in this embodiment. When a user instructs the computer 100, using the keyboard and/or mouse 102, to run the program for people counting, the cameras 106a, 106b are activated. Images are acquired by the cameras 106a, 106b of the room at predetermined intervals (for example, every 10 seconds) and sent to the computer 100. The CPU runs the program which performs the method steps of the people counting embodiment and illustrates the people count result on the VDU 104. The number of people is logged over time by the CPU on the HDD.

While the invention has been described in reference to its preferred embodiments, it is to be understood that the words which have been used are words of description rather than limitation and that changes may be made to the invention without departing from its scope as defined by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The claims defining the invention are as follows:

1. A method of identifying one or more features represented in a plurality of sensor acquired data sets, the method comprising:
    determining a first probability of the identity of the one or more features from a first one of the data sets;
    determining a second probability of the identity of the one or more features from a second one of the data sets;
    fusing the determined first and second probabilities to provide a fused probability;
    after the fusing:
        determining $p(n)$;
        fusing $p(fused_{n-2})$ with $p(n)$ to provide $p(fused_{n-1})$, where $p(n)$ is a probability of the one or more features being present in an $n^{th}$ one of the images, and $p(fused_{n-2})$ and $p(fused_{n-1})$ are $(n-2)^{th}$ and $(n-1)^{th}$ fused probabilities, respectively; and
        repeating the determining of $p(n)$ and fusing $p(fused_{n-2})$ with $p(n)$ for m times, where $m=n-2$, and n is an integer greater than 2; and identifying the one or more features from the fused probability, wherein the identifying uses (fused$_{n-1}$).

2. The method of claim 1, wherein an algorithm selected from the group comprising Bayesian Fusion, Distributed Data Fusion, Dempster-Shafer Fusion, Fuzzy Fusion, Random Sets Based Fusion, Voting and Dezert Samaranche Fusion is used in the fusing to fuse the determined probabilities.

3. The method of claim 1 further comprising, after the fusing:
   determining a third probability of the identity of the one or more features being present in a third one of the data sets; and
   fusing the first mentioned fused probability and the third probability to provide a second fused probability,
   wherein the identifying uses the second fused probability.

4. The method of claim 1, wherein each of the probabilities are probability distributions representing probabilities of the presence of each one of a set of predetermined said features in their respective data sets and wherein the identifying is performed by determining which of the predetermined features has the highest probability from the probability distribution of the fused probability.

5. The method of claim 1, wherein the one or more features comprise alphanumeric characters, and wherein each of the plurality of data sets comprise different respective representations of a vehicle license plate, the plate displaying one or more of the alphanumeric characters.

6. The method of claim 5, wherein when the plate displays a combination of at least two alphanumeric characters, the method is repeated to identify a first one of the two characters and then a second one of the two characters from each of the at least two data sets.

7. The method of claim 5 wherein, prior to determining the first probability, the number of alphanumeric characters present on the plate is determined, and the remainder of the method is performed for each alphanumeric character determined as present on the plate.

8. The method of claim 1 wherein the plurality of data sets represent respective images comprising a representation of a license plate and the one or more features comprise respective location(s) of the license plate in respective said images.

9. The method of claim 8 wherein the first and subsequent probability(ies) are first and subsequent probability density functions representing the probability of the license plate being in a location in the image.

10. The method of claim 8 wherein, prior to determining the first probability, the images used in the method are subjected to black and white image thresholding and the probability determinations are performed on the thresholded black and white images.

11. The method of claim 8 wherein the first and subsequent probabilities are determined using one or more parameters of the following group: size of a potential representation of the license plate compared to other potential representation(s) of the license plate; shape of the potential representation of the license plate; similarities of size and/or shape of the potential representation of the license plate in one of the images compared to the size and/or shape of another potential representation in another of the images; and the position of the potential representation of the license plate in one of the images relative to the position of another potential representation in another of the images.

12. The method of claim 1 implemented by a computer.

13. A computer program product stored on a non-transitory computer-readable medium and configured to cause a computer to perform the method of claim 1.

14. A non-transitory computer readable medium providing the computer program of claim 13.

15. A system for identifying one or more features represented in a plurality of sensor acquired data sets, the system comprising:
   one or more sensors configured to acquire a plurality of data sets;
   a device in communication with the one or more sensors configured to acquire the data sets from the one or more sensors;
   a calculating device configured to perform the method of claim 1.

16. A method of identifying a vehicle registration number from a plurality of images comprising representations of a vehicle registration plate, the method comprising:
   determining a first probability distribution of alphanumeric characters present in a portion of one of the images;
   determining a second probability distribution of alphanumeric characters present in a portion of another of the images, the portion of the other of the images corresponding to the portion of the one of the images;
   fusing the first and second probability distributions to provide a fused probability distribution of alphanumeric characters in relation to the one and the other images;
   after the fusing:
      determining p(n);
      fusing p(fused$_{n-2}$) with p(n) to provide p(fused$_{n-1}$), where
      p(n) is a probability density function in relation to alphanumeric character being present in an n$^{th}$ one of the images, and
      p(fused$_{n-2}$) and p(fused$_{n-1}$) are (n-2)$^{th}$ and (n-1)$^{th}$ fused probability density functions, respectively; and
      repeating the determining of p(n) and fusing p(fused$_{n-2}$) with p(n) for m times, where m=n-2, and n is an integer greater than 2; and
   identifying which alphanumeric character is present in the respective portions of the one and the other images by identifying from the fused probability distribution the alphanumeric character having the highest probability of being present, wherein the identifying comprises using (fused$_{n-1}$) to identify the alphanumeric character with the highest probability of being present.

17. The method of claim 16, wherein an algorithm selected from the group of algorithms comprising Bayesian Fusion, Distributed Data Fusion, Dempster-Shafer Fusion, Fuzzy Fusion, Random Sets Based Fusion, Voting and Dezert Samaranche Fusion is used in the fusing to fuse the first and second probability distributions.

18. The method of claim 16 further comprising, prior to determining the first probability distribution, determining the number of alphanumeric characters present on the vehicle registration plate, and performing the method for each alphanumeric character present on the vehicle registration plate.

19. A system for identifying one or more features represented in a plurality of sensor acquired data sets, the system comprising:
   one or more sensors configured to acquire a plurality of data sets;
   a device in communication with the one or more sensors configured to acquire the data sets from the one or more sensors;
   a calculating device configured to:
      determine a probability of the identity of one of the features from at least two said data sets;
      fuse the determined probabilities to provide a fused probability;

after the fusing:
fuse $p(fused_{n-1})$ with $p(n)$ to obtain $p(fused_{n-1})$, where $p(n)$ is a probability density function in relation to alphanumeric characters being present in an $n^{th}$ one of the images, and $p(fused_{n-2})$ and $p(fused_{n-1})$ are $(n-2)^{th}$ and $(n-1)^{th}$ fused probability density functions, respectively; and repeat the determining of $p(n)$ and the fusing $p(fused_{n-2})$ with $p(n)$ for m times, where $m=n-2$, and n is an integer greater than 2; and an identifying device configured to identify the one or more features from the fused probability, using $(fused_{n-1})$ to identify the alphanumeric character with the highest probability of being present.

20. The system of claim 19 wherein an algorithm selected from the group of algorithms comprising Bayesian Fusion, Distributed Data Fusion, Dempster-Shafer Fusion, Fuzzy Fusion, Random Sets Based Fusion, Voting and Dezert Samaranche Fusion is used to fuse the determined probabilities.

* * * * *

UNITED STATES PATENT AND TRADEMARK OFFICE
CERTIFICATE OF CORRECTION

| | | |
|---|---|---|
| PATENT NO. | : 8,457,408 B2 | Page 1 of 1 |
| APPLICATION NO. | : 12/439531 | |
| DATED | : June 4, 2013 | |
| INVENTOR(S) | : Subhash Challa | |

It is certified that error appears in the above-identified patent and that said Letters Patent is hereby corrected as shown below:

In the Claims:

Column 14, line 27, delete "provide", insert -- obtain --;

Column 14, line 30, delete "character", insert -- characters --;

Column 14, line 34, delete "and fusing", insert -- and the fusing of --.

Signed and Sealed this
Eleventh Day of March, 2014

Michelle K. Lee
*Deputy Director of the United States Patent and Trademark Office*